Jan. 25, 1966   E. C. HINCK III   3,231,749
WAVE POWER GENERATOR
Filed April 12, 1963   2 Sheets-Sheet 1

INVENTOR.
ERNEST C. HINCK III
BY
AGENT

Jan. 25, 1966 E. C. HINCK III 3,231,749
WAVE POWER GENERATOR
Filed April 12, 1963 2 Sheets-Sheet 2

INVENTOR.
ERNEST C. HINCK III
BY
AGENT

United States Patent Office 3,231,749
Patented Jan. 25, 1966

3,231,749
WAVE POWER GENERATOR
Ernest C. Hinck III, Wharton, N.J., assignor to Thiokol Chemical Corporation, Bristol, Pa., a corporation of Delaware
Filed Apr. 12, 1963, Ser. No. 272,765
2 Claims. (Cl. 290—53)

The present invention relates generally to the generation of electrical energy and more particularly to an apparatus for converting the natural energy of fresh and salt water wave motion to electrical energy which may be immediately utilized or stored as in a battery.

Many buoys in use today as navigational aids, wreck markers, etc., requires a source of electrical energy over relatively long periods to power lights and other electrical devices as do other special purpose buoys, floats, etc. Storage batteries are currently being used and while their useful life may be more than ten years, their service life between rechargings is less than one year. However, the service life of conventional sea buoys is about two years at which time they must be replaced and overhauled, so that a similar service life for the electrical power system is naturally most desirable.

Various apparatus are known in the art for converting the kinetic energy of wave motion to electrical energy and many of these have been unsatisfactory in use due to a lack of awareness on the part of their designers that buoy movements or gyrations, effected by waves, are as complex as the motions of the ocean itself. Many factors influencing the motions are involved including wind, current, depth of water, shore effects, wakes, etc.

While the patterns of ocean, etc., movements are too complex for intuitive understanding, the various components can be isolated and considered as actuating forces which generate buoy movement. Although the resulting buoy movement is not a simple motion, it may be resolved into two basic modes: a vertical movement or bobbing relative to a horizontal plane caused by the rise and fall of the waves; and a rocking motion relative to the vertical axis caused by the shift of the metacenter of the buoy due to the slope of the wave front.

While the bobbing motion is a potential source of energy, the present invention is directed toward an improved apparatus for absorbing the energy available in the rocking mode of oscillation and converting it into electrical energy.

Accordingly, the main object of the present invention is to provide an improved apparatus for converting the energy of wave motion to electrical energy.

An important object of the present invention is to provide an improved apparatus for utilizing the energy of the rocking mode oscillation of a buoy by converting it into electrical energy.

A further important object of the present invention is to provide an improved apparatus for converting wave motion energy to electrical energy by means of a buoy in which a pendulum like member is oscillated or rotated by gravitational forces to actuate a generator.

A still further important object of the invention is to provide an improved apparatus of the type described which employs novelly arranged ballast, stabilizing, and housing reinforcing means.

Another object of the present invention is to provide a novel and improved apparatus of the type described which is of unique although simple construction so as to be susceptible of ready and economic manufacture and of long, trouble free life in use.

Other objects and advantages of the present invention will become apparent during the course of the following description:

In the drawings I have shown several embodiments of the invention. In these showings:

In its broadest aspects, the invention contemplates the utilization of gravitational forces on a freely oscillatable or rotatable pendulum-like member which is constrained to move in a plane perpendicular to the vertical axis of a supporting body such as a buoy when the latter is tilted or rocked as by wave motion, the pendulum motion effecting the driving of an electrical generator, alternator, etc.

For purposes of illustration, the invention is disclosed as applied to a buoy although it will be understood that the supporting body may take any of various forms as long as there is relative rocking movement between the water and the body.

Figure 1:
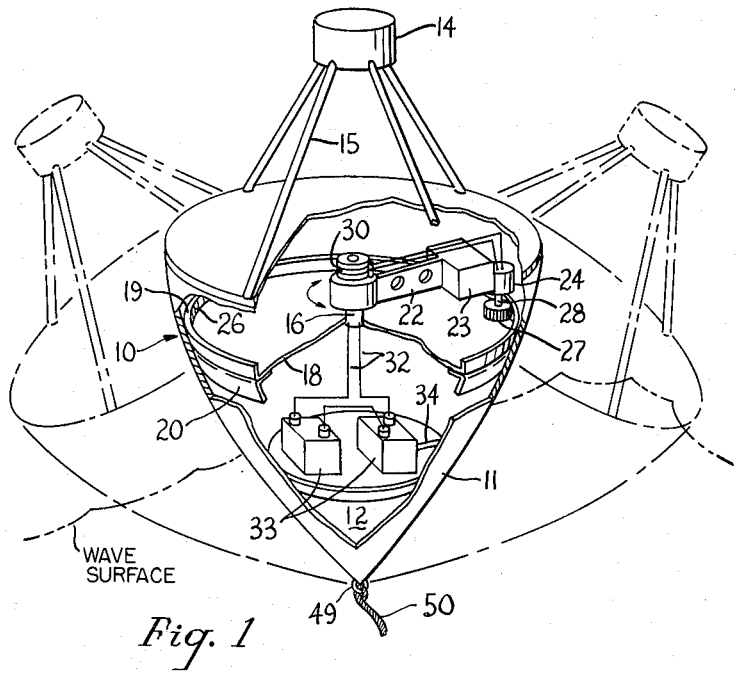
FIGURE 1 is a central, vertical sectional view of a preferred embodiment of the invention.

Referring to FIGURE 1 of the drawings, numeral 10 designates the supporting body as a whole which is shown as a sealed and watertight buoy housing or shell 11 of generally conventional exterior design and shape. The buoy is provided with ballast 12 at its lowermost point and a lesser amount 14 at its uppermost point, the top of a bracket 15 fixed to the upper surface of the buoy.

A vertical shaft 16 is mounted centrally of the buoy 10 and coincident with its axis by means of a spider 18 which includes an upturned annular flange 19 at its outer periphery, all being supported by and fixed to an annular bracket 20 having a horizontal inturned flange. A pendulum 22 is rotatably fixed to the shaft 16 and includes a weight or bob 23 fixed to its outer end and a generator 24 fixed to the outer side of the weight.

The inner face of the upturned flange 19 is serrated or toothed as at 26 so as to form a track for and mesh with a knurled wheel or gear 27 fixed to the lower end of the armature shaft 28 of the generator 24. It will be appreciated that by a proper choice of materials, certain plastics, etc., for the flange track 19 and the wheel 27, the drive of the wheel by the track 19 can be by mere friction as the pendulum 22 swings about the shaft 16 as the buoy rocks.

The pendulum 22 is constrained by its mounting on the shaft 16 to move in a plane perpendicular to the vertical axis of the buoy 10, and is free to rotate as the buoy tilts or rocks. The action of the pendulum is independent of the direction of tilt and relies solely on the oscillatory motion through the vertical. The power developed per swing is a function of the radius arm, the weight of the bob (plus the generator), the angle of tilt of the buoy, and the time of swing. It will be appreciated that an increase in weight results in a larger amplitude of rocks so as to afford a measure of control thereover.

The current generated by the driven generator 24 as the pendulum swings is conveyed to slip rings 30 on the shaft 16 and thence by conductors 32 to one or more batteries or energy storing devices 33 which may be provided with vents as at 34 having one-way check valves if desired. It will be apparent that the structure described could be prepackaged and sealed against the environment with a life expectancy of several years for use as a sonar or lighted buoy and as a shipboard battery charger.

Figure 2:
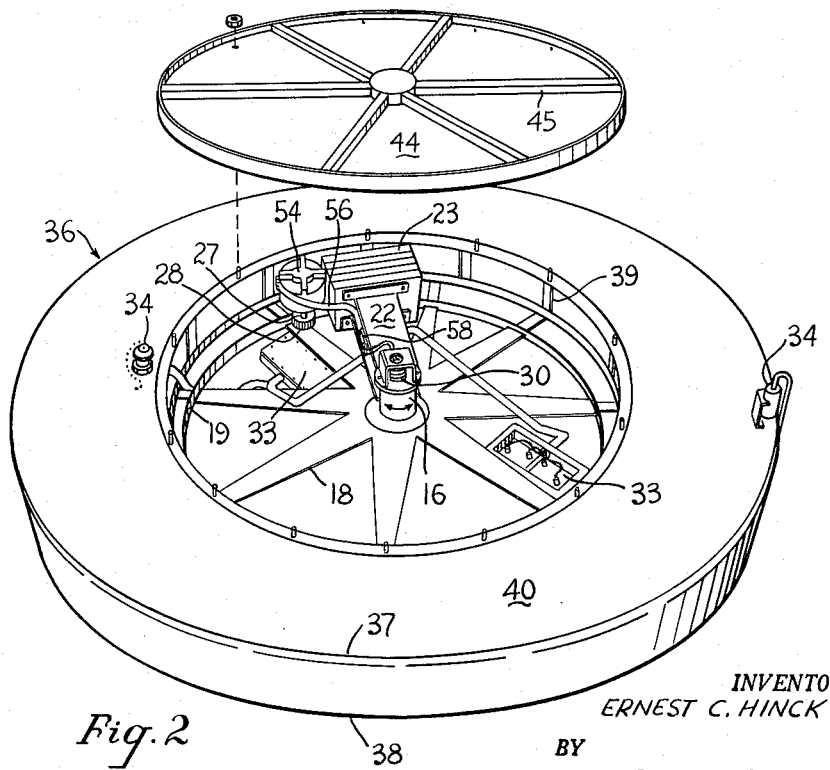
FIGURE 2 is a top perspective exploded view of another preferred embodiment of the invention.
Figure 3:
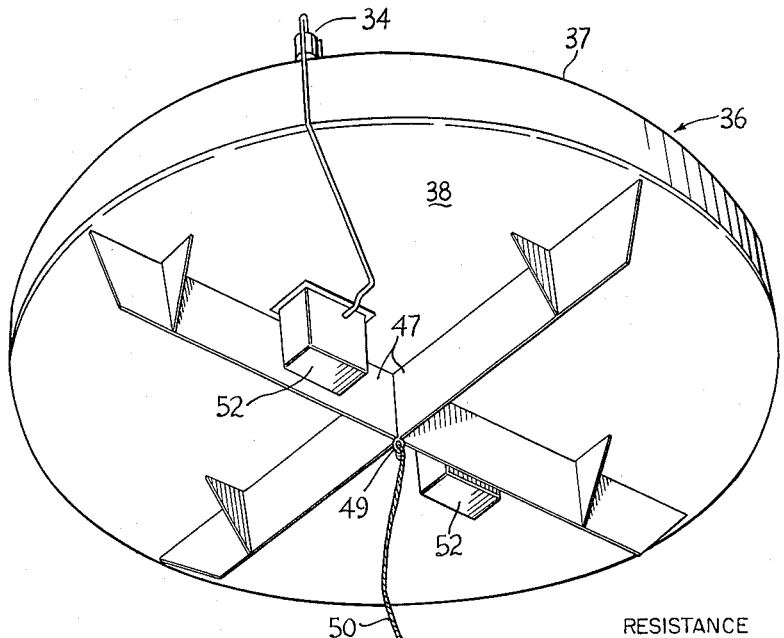
FIGURE 3 is a bottom perspective view thereof.
Figure 5:
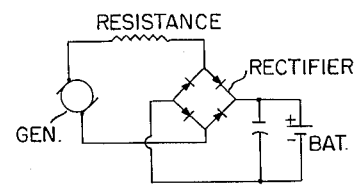
FIGURE 5 is a schematic showing of the electrical circuit.

FIGURES 2 and 3 disclose another preferred embodiment of the invention in which parts similar to parts of FIGURE 1 are given similar numbers. In this form of the invention, a buoy indicated as a whole by numeral 36 is provided with a shell 37 having a circular, generally flat configuration of relatively light gauge metal or plastic requiring reinforcement due to the stresses imposed by the weight of the energy converting parts.

As shown, the spider 18 upon which the pivot shaft 16 is mounted is fixed to the bottom 38 of the shell as by welding or fusing and rigidity is further ensured by short vertical struts 39 fixed to outer portions of the spider spokes 18 and to the top 40 of the buoy shell 37 at circumferentially spaced points. The shell top 40 is provided with a circular access opening 42 which may be closed and sealed by a gasketed cover 44 provided with radial reinforcing ribs 45.

The buoy shell 37 is of much greater span than height for adequate buoyancy and stability and its bottom 38 is desirably provided with vertically disposed, radially extending stabilizing fins 47 at the center of which an eye 49 for an anchoring cable 50 is provided. The fins aid the rocking mode of oscillation by curtailing any tendency of the gently curved lower side 38 of the buoy 36 from "planing" along the wave slopes. This is aided by mounting the energy storing batteries 33 in wells 52 depending from the shell bottom 38 in diametrically opposed, balanced relationship along the fins 47.

As shown in FIGURE 2 the bob or weight 23 supports a permanent magnet alternator 54 on a side face over the track 19 which drivably engages the drive wheel or gear 27 fixed to the alternator shaft 28 to produce alternating current electrical power independently of the direction of rotation of the pendulum 22. The generated current is carried by conductors 56 to a rectifier and regulator 58 and then to the slip or collecting rings 30 and thence to the energy storing devices or batteries 33 in the wells 52 which are below the plane of rotation of the pendulum 22. With a pendulum bob or weight of 30 pounds, under average wave conditions, power of from 1 to 10 watts is readily produced by the alternator 54.

Figure 4:
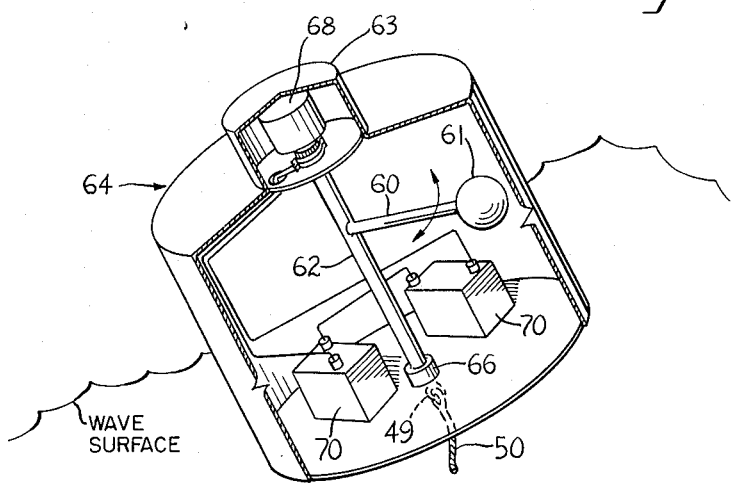
FIGURE 4 is an elevational view of a simplified embodiment of the invention.

The embodiment of the invention disclosed in FIGURE 4 is a simplified version of the application of the pendulum principle to convert wave energy to electrical power. A horizontally disposed pendulum 60 terminating in a bob or weight 61 is fixed to a vertical rotatable armature shaft 62 of a generator housing 63, the shaft coinciding with the axis of a sealed buoy 64 and being supported in a suitable thrust bearing 66.

Rotation of the pendulum and bob, 60, 61, in either direction upon rocking of the buoy 64 may be utilized through a suitable ratchet arrangement contained in housing 63 and shaft power delivered may be stored in a spring or flywheel and used to drive the generator 68, the generated electrical energy being delivered by conductors 69 to batteries 70.

It is to be understood that the forms of the invention herewith shown and described are to be taken as preferred examples of the same and that various changes in the shape, size, and arrangement of parts may be resorted to without departure from the spirit of the invention or the scope of the subjoined claims.

I claim:

1. Apparatus for converting the energy of wave motion to electrical energy comprising, in combination, a compact, enclosed, buoyant housing adapted to be rocked by passing waves; a ring mounted in and coaxially with the vertical axis of said housing; a pendulum pivotally mounted in said housing for rotation about and in a plane perpendicular to said axis; a weight mounted on the outer end of said pendulum, generating means mounted on said weight and including a driving wheel engaging said ring to be driven thereby to generate electrical energy upon rotary movement of said pendulum due to gravitational forces as said housing rocks; and means within said housing for storing said generated electrical energy.

2. The combination recited in claim 1 wherein said generator means comprises an alternator, and rectifying means is mounted on said pendulum and electrically connects said alternator and said storage means.

References Cited by the Examiner

UNITED STATES PATENTS

| 524,490 | 8/1894 | Singer et al. | 230—68 |
| 1,233,199 | 7/1917 | Giera | 9—8 X |
| 1,318,650 | 10/1919 | Dutka | 9—8 |
| 1,584,293 | 5/1926 | Hegenbarth | 253—5 |
| 1,682,176 | 8/1928 | Hegenbarth | 253—5 |
| 2,546,956 | 3/1951 | Yeomans | 9—8 |

FOREIGN PATENTS 719,303    11/1931    France.

ORIS L. RADER, *Primary Examiner.*

MILTON O. HIRSHFIELD, *Examiner.*